May 2, 1967 S. S. DAVIS 3,317,052
FILTER MEDIA WEB CLEANING APPARATUS
Filed July 13, 1964

INVENTOR:
STEVEN S. DAVIS
BY: Robert W. Habif
ATTORNEY

United States Patent Office 3,317,052
Patented May 2, 1967

3,317,052
FILTER MEDIA WEB CLEANING APPARATUS
Steven S. Davis, Bountiful, Utah, assignor to The Eimco Corporation, Salt Lake City, Utah, a corporation of Delaware
Filed July 13, 1964, Ser. No. 382,091
2 Claims. (Cl. 210—393)

This invention relates generally to vacuum filters of the endless filter media web type having a cake discharge section spaced from the filtration section and more particularly to improved ways and means for continuously cleaning the web during filtering such that blinding is substantially eliminated.

Heretofore the filter web in vacuum filters of the drum or horizontal belt type have been cleaned simply by continuously spraying a wash liquid such as water on the web following cake discharge and before return of the web to the drum. While this method has proved effective when blinding is caused by easily removable solids on the web, it leaves much to be desired in filtering liquid slurries that tend to form hard scales in the interstices of the web which cannot be dislodged by simply spray washing. This is particularly true in the filtration of any mud or sludge underflows in which lime has been added such as beet sugar mud or conventional sewage sludge. Also in the filtration of white liquor from paper pulp production the problem is even more pronounced since the liquor is separated from a slurry or calcium carbonate. In each of the above cases calcium carbonate forms and collects in the filter media interstices and can be removed only by discontinuing the filtering operation and spraying acid wash liquor on the web to react with and dissolve the carbonate solids blinding the web. This is an expensive and time consuming operation since down time is considerable, it being necessary to clean the filter at least every 24 hours in order to maintain a satisfactory rate. Even then it has often been found that the media is so blinded that it is impossible to regain the original filtering rate despite numerous acid washings.

Therefore, it is a primary object of this invention to provide an apparatus for effectively preventing blinding of filter media webs in vacuum filtration apparatus even under the most adverse feed slurry conditions.

An important object of the invention is to provide apparatus for cleaning an endless filter media web in vacuum filtration apparatus that can be used continuously during the filtering operation.

Another object of the invention is to provide web cleaning apparatus for vacuum filters that is simple, efficient and inexpensive to operate.

Briefly, the invention comprises completely submerging contiguous sections of the filter medium web in a suitable solvent solution subsequent to cake discharge and before return of the web to the filtering section so that solids blinding the web are dissolved. Submergence is effected by training the filter media web around a series of spaced apart rollers at least one of which is disposed near the bottom of a solvent trough in axial alignment with the roller. In a preferred embodiment squeegees are suitably mounted successively in contact with the web so as to force out filtrate, spray wash liquid, and solvent from the web during its path of travel through the cleaning section.

In order that the invention may be more readily understood and carried into effect reference is made to the accompanying drawing which is offered by way of example only and not in limitation of the invention, the scope of which is defined by the appended claims rather than any description preceding them.

Figure 1:
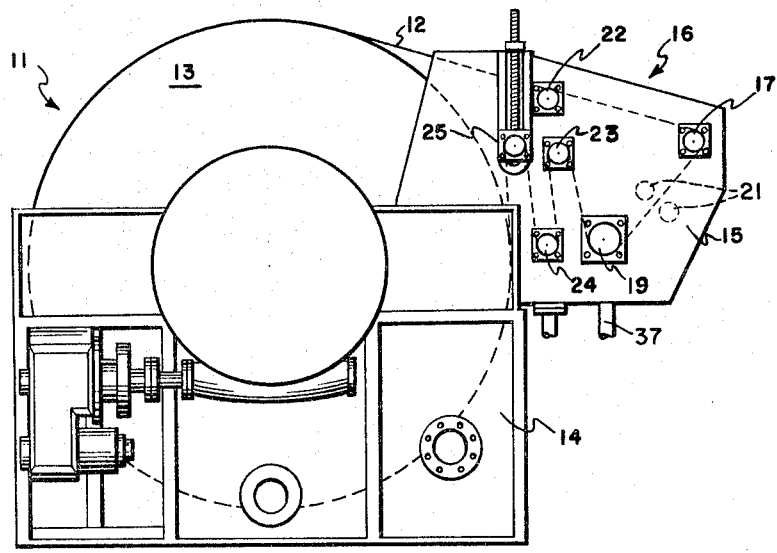
FIG. 1 is a side view of a rotary drum filter embodying the invention.
Figure 2:
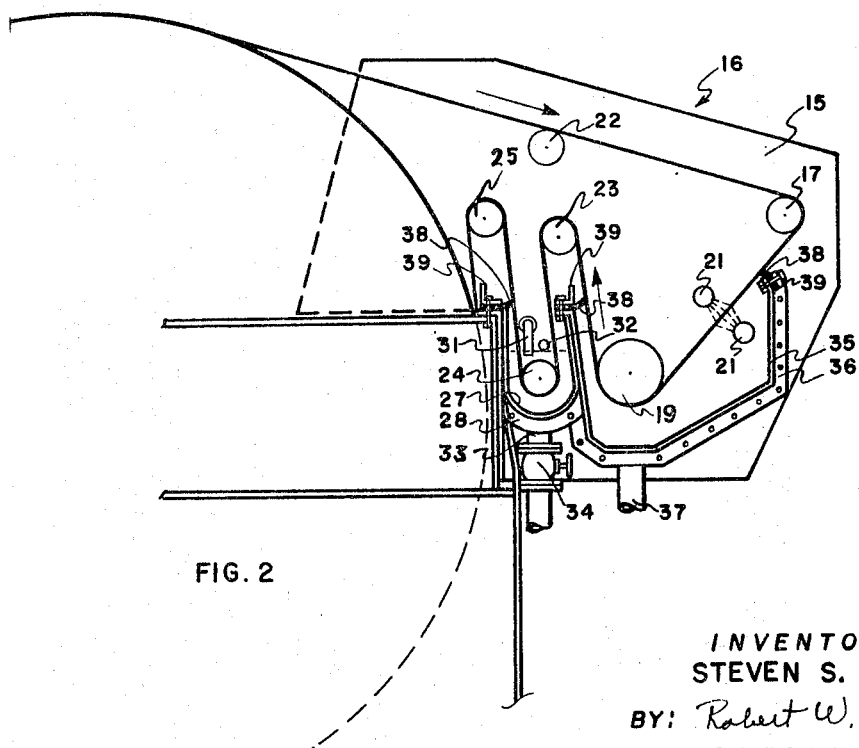
FIG. 2 is an enlarged, more or less schematic, partial side view of a filter similar to that shown in FIG. 1 but with the side plate of the cake discharge section removed to show internal parts.

Referring to the figures, there is shown a rotary drum filter generally designated 11 having a filter media web 12 made of nylon or other suitable synthetic polymer trained to pass around a drum 13 journalled for rotation in a tank 14 forming a filter section and a series of rollers journalled between side plates 15 forming a cake discharge and web cleaning section 16 spaced from the drum. Cake is discharged from the web at roller 17 from which the web is trained to pass around a roller 19, an initial spray wash section provided between the rollers as by spray nozzles 21 a plurality of which are spaced in line along both sides of the web. One or more support rollers 22 may be provided between the drum and discharge roller 17 as desired.

In accordance with the invention, the web is trained around rollers 23, 24 and 25 after leaving the spray wash section and before returning to the drum deck. It will be observed that roller 24 is positioned near the bottom of a trough 27 the trough having end flanges 28 by which it is bolted to side plates 15. Solvent is fed to the trough through inlet port 31, the solvent level therein maintained by overflow conduit 32 approximately as indicated by the broken line. A drain 33 facilitates removal of solvent whenever desired which may be controlled as by valve 34. Mounted adjacent solvent trough 27 is a wash spray collection trough 35 similarly bolted between side plates 15 by a depending flange 36. Trough 34 serves merely to collect and remove spray and filtrate dripping from the web such drippage being removed as fast as it will flow through the bottom drain 37. While troughs 27 and 35 are shown as separate parts, they may be unitized in a single piece having separate compartments for the two functions.

Mounted on the upper lip portion of the side walls of troughs 27 and 34 are squeegee wiping blades 38 secured thereto by clamping members 39. Such wiping blades are important since they facilitate removal of the excess fluid from the filter web during operation. For example, as the web leaves discharge roll 17 excess filtrate is squeezed out and any filter cake remaining on the web surface is deflected off. Similarly, wash liquid and solvent remaining in the web from the spray washing and solvent immersion stages are forced out of the web by the remaining two squeegees. The combination of squeegees, spray wash and submersion enables effective removal of all foreign matter from the web resulting in a clean web being continuously returned to the drum deck for further filtering of the slurry.

A particular application in which the invention has proved very successful is in the filtration of white liquor derived from manufacture of paper pulp. As previously noted, filter webs have a tendency to blind quickly from calcium carbonate formation during the filtration of such slurries and the filter must periodically be shut down and the media cleaned before operations can continue. However, using the vacuum filtration apparatus of the instant invention filtration can be continued without interruption caused by blinding for as long as necessary. During such operation the web is initially sprayed with water through nozzles 21 and a dilute solution of hydrochloric acid is maintained in trough 27. As the web passes through trough 27 a slight amount of foaming occurs due to the reaction of entrained calcium carbonate with the acid. This foam is removed by a squeegee and continually forced back into the trough for eventual removal therefrom. The solvent action of the acid on the solids entrained in the web is enhanced by complete submersion of the web in the trough and as a result thereof substantially all foreign matter is effectively removed from the web. With such an arrangement little or no buildup of solids occurs in the web and the original filtering rate is maintained.

It should be noted that vacuum filtration apparatus embodying the solvent wash trough of the invention may be used in any operations where filter media blinding is a problem and in such cases any suitable solvent may be utilized depending upon the material to be removed.

From the foregoing it will be seen that there is provided an apparatus for continuously cleaning an endless filter medium web in vacuum filters that enables the filtration operation to continue without periodic shut down of the apparatus and without any decrease in original filtering rate.

I claim:

1. Vacuum filtration apparatus comprising an endless filter media web trained to pass around a cake discharge section spaced from a filter section, means for continuously cleaning said web, said means comprising a first wiping means for squeezing filtrate from said web following cake discharge, means for spraying said web with water following said first wiping means, second wiping means for removing wash water from said web, a solvent holding trough, means for passing said web through said trough after removing excess wash water therefrom by said second wiping means whereby contiguous sections of the web are submerged in solvent, third wiping means for removing solvent from said web, and means for returning said web to said filtering section.

2. Rotary drum vacuum filter apparatus comprising an endless filter media web trained to pass around a cake discharge section spaced from the drum filtration section, means for continuously cleaning said web, said means comprising wiping means for squeezing filtrate from said web following cake discharge, means for spraying said web with water following said wiping means, second wiping means for removing wash water from said web, a solvent holding trough, means for passing said web through said trough after removing excess wash water therefrom whereby contiguous sections of the web are submerged in solvent, third wiping means for removing said solvent from said web, and means for returning said web to said filtering section.

References Cited by the Examiner

UNITED STATES PATENTS

| | | | |
|---|---|---|---|
| 1,612,873 | 1/1927 | Mauss | 210—396 X |
| 2,097,529 | 11/1937 | Nordell | 210—393 |
| 2,529,882 | 11/1950 | Mittman | 210—400 X |
| 2,713,022 | 7/1955 | Dole et al. | 210—393 X |
| 2,937,069 | 5/1960 | Zoellner | 8—137 |

FOREIGN PATENTS 90,104 11/1909 Germany.

REUBEN FRIEDMAN, *Primary Examiner.*

D. M. RIESS, *Assistant Examiner.*